J. M. DILLON.
CHAIN SHEAVE.
APPLICATION FILED OCT. 12, 1914.

1,205,335.

Patented Nov. 21, 1916.

Witnesses
James P. Haskell.
John M. Stager

Inventor
John M. Dillon,
By Walter N. Haskell,
his Attorney

UNITED STATES PATENT OFFICE.

JOHN M. DILLON, OF STERLING, ILLINOIS.

CHAIN-SHEAVE.

1,205,335.   Specification of Letters Patent.   Patented Nov. 21, 1916.

Application filed October 12, 1914.   Serial No. 866,221.

*To all whom it may concern:*

Be it known that I, JOHN M. DILLON, a citizen of the United States, residing at Sterling, in the county of Whiteside and State of Illinois, have invented certain new and useful Improvements in Chain-Sheaves, of which the following is a specification.

My invention has reference to chain sheaves, of that class which is used in connection with hoisting jacks, fence stretchers and similar devices, and is designed to overcome some of the objectionable features in those articles, as at present employed. On account of the heavy character of the work which these tools are called upon to perform, it is necessary to use a chain of the heaviest character, such as log-chains, in which the alternate links are in planes at right angles to each other, and it frequently happens that the links of the chain become stretched or lengthened by reason of the wear on the links or the strain exerted thereon. The device then becomes inoperative on account of the links of the chain not registering properly, whereby they work up or "ride" on the projecting parts or sides of the sheave, to the injury of the chain, and frequently destroying both chain and wheel upon which it operates. This is not so apt to happen in cases where the wheel is of such size that a number of the links of the chain are in engagement therewith at the same time, but it is frequently desired to use a wheel of so small a size that only a limited number of links are in operative engagement therewith at the same time.

The chief purpose of the present invention is to provide a sheave for the chain which will accommodate itself to any increase in the links of the chain, or to chains possessing links of various lengths or widths, without in any way affecting the operation of the chain or wheel. The manner in which this is accomplished will more fully appear in the following specification, reference being had to the drawings accompanying the same, in which:—

Figure 1:
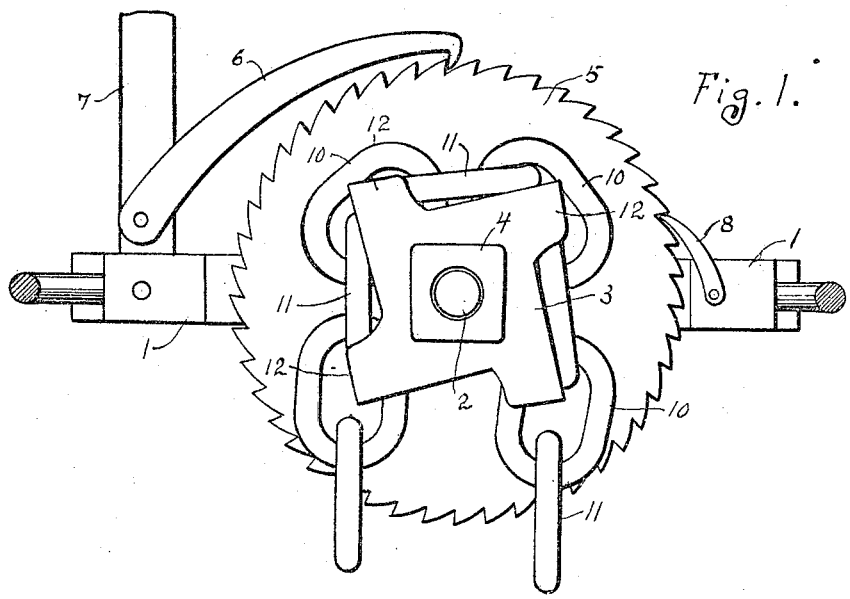
Figure 2:
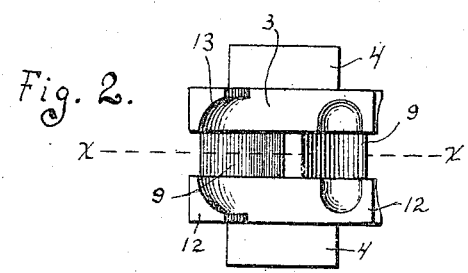
Figure 3:
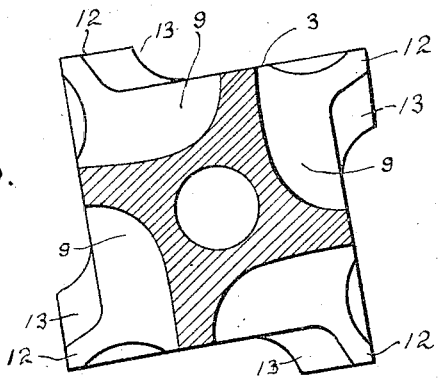

Figure 1 shows my device in side elevation, when in use, with a part of its support cut away. Fig. 2 is an edge view thereof. Fig. 3 is an enlarged view, in section on the line $x$—$x$ of Fig. 2.

1 represents a frame of any suitable construction, in which is mounted a shaft 2, upon which is rotatably held a wheel 3, which is substantially rectangular in form. The wheel is provided with a hub 4, on each end of which is fixed a ratchet-wheel 5, (one only being shown,) said wheels being alternately actuated in any suitable manner, as by a dog 6 pivoted to a lever 7, pivotally secured to the frame 1. Rearward movement of the wheel 5 is prevented by a pawl 8 pivoted at the other end of the frame. The last-named mechanism is not involved in the present application, which relates to the structure of the wheel 3 alone. The central part of the wheel 3 is cut away, and provided with recesses 9, which accommodate the links 10 of the chain, the alternating links 11 thereof being engaged by the flat faces or edges of the wheel. At each of its corners the wheel 3 is provided with projections 12, having recesses 13 to accommodate one end of the links 11. It will be seen that the straight edge or face of each of the projections 12 provides an extension for the seat of the link 11, permitting a considerable variation in the length of the links 11 without affecting the practical operation of the wheel. The shape of the wheel is also such that the links of the chain are readily engaged thereby, and after passing around the wheel, as readily disengage themselves, as shown in Fig. 1. There are no parts of the wheel which will cause the links of the chain to cling thereto, as is the case with some wheels.

What I claim as my invention, and desire to secure by Letters Patent of the United States, is—

1. A chain sheave, provided with rectangular faces adapted to receive the alternate links of a chain; projections forming extensions of said faces; and means for accommodating the alternating links of said chain.

2. A chain-sheave, provided with rectangular faces adapted to receive the alternate links of a chain; and projections forming extensions of said faces and provided in their inner faces with recesses conforming to the shape of said chain links; said wheel being further provided centrally with a series of recesses adapted to receive the links of said chain which alternate with said first-named links.

In testimony whereof I affix my signature in presence of two witnesses.

JOHN M. DILLON.

Witnesses:
W. N. HASKELL,
FRED GEORGE.